3,059,615
ANIMAL LITTER

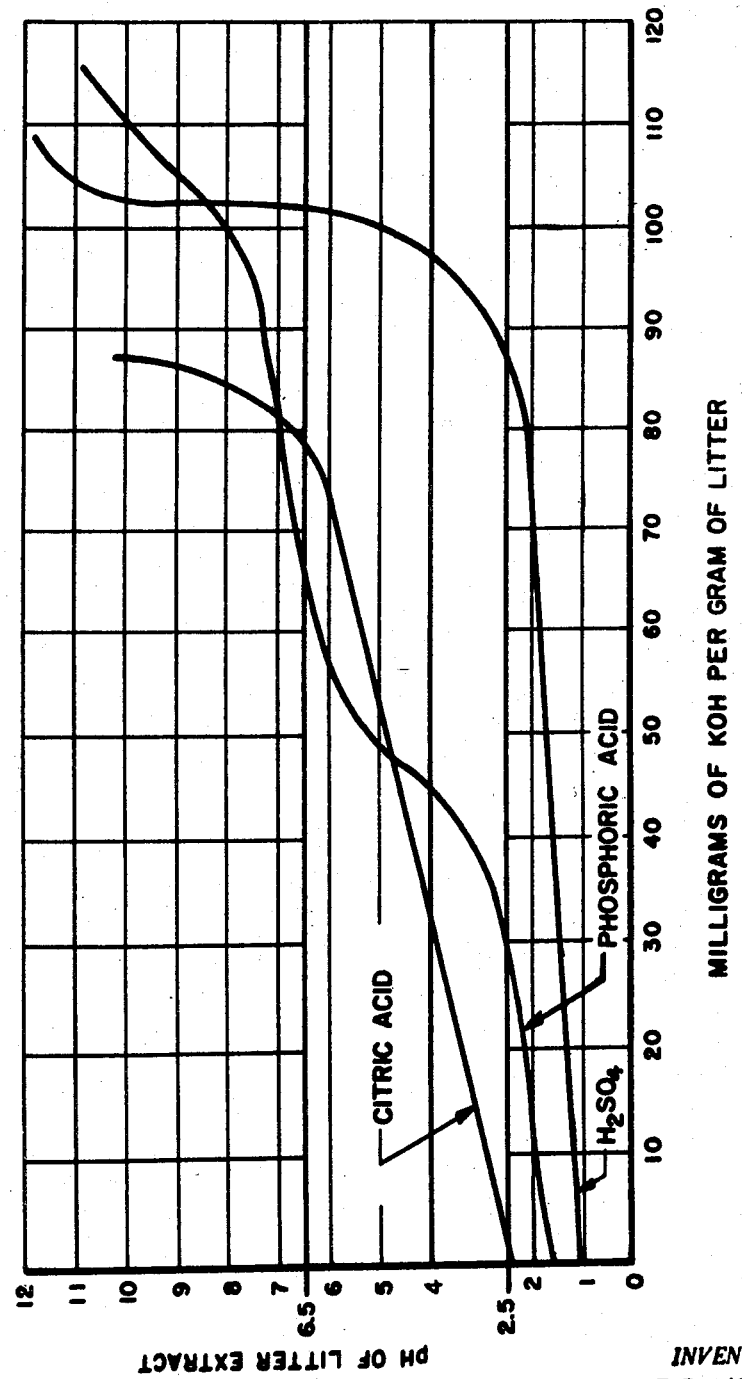

Vincent P. Kuceski, Park Forest, and Chester K. McMillen, La Grange, Ill., assignors to The C. P. Hall Company of Illinois, Chicago, Ill., a corporation of Ohio
Filed Jan. 19, 1959, Ser. No. 787,463
6 Claims. (Cl. 119—1)

This invention relates to an animal litter to be used on the floor of a cage or an exercise area for birds, dogs, cats, guinea pigs, rabbits, mice, monkeys, reptiles, poultry, etc.

The litter is an acidic cellulosic material. The cellulosic material may be any of the many cellulosic materials previously used for such purposes, such as dried grasses or hay, husks, sawdust, corn cob grits, excelsior, cereal hulls, etc.

It is old to acidify cellulosic materials to produce animal litter, as with sulfuric or other inorganic acids, but such litters have either an objectionably low pH or an inefficiently low neutralization capacity. By neutralization capacity is meant the measure of the ability of the litter to neutralize basic materials such as ammonia and amine of animal urines and basic decomposition materials produced by the decay of fecal material from the animals and particularly such materials which are gaseous and objectionable to man, and often-times to the animals also, because of their odor.

Neutralization capacity, as that term is used herein, is the number of milligrams of KOH required to neutralize a room-temperature aqueous maceration of 1 gram of sample.

The animal litter of this invention is sufficiently acidic to destroy *Salmonella pullorum* and like bacteria which are apt to infest the cellulosic material before being used in the litter. A pH of no higher than about 3.5 is required for this purpose. If the pH is below about 2.5, the litter will irritate the feet of the animals and be harmful to the skin or fur of certain animals.

The litter is effective in neutralizing objectionable basic odors until it reaches a pH of about 6.5. The fecal matter from certain animals may be so abundant that it is desirable to replace the litter before it reaches this pH. It loses its effectiveness at about pH 6.5 and will be replaced if still in use. An indicator which changes color at this pH can be added to serve as a warning that it is time to change the litter. Litter in the corner of a cage is apt to receive more urine than the rest, and an indicator will be particularly advantageous where the practice is to replace only part of the litter at any one time. If the used litter is burned, it has a low ash content as its ingredients are largely organic.

Thus, the animal litter of this invention has an initial pH of 2.5 to 3.5, to be toxic to *Salmonella pullorum* and the like, without being irritating to the animals or harming them in any way, and it has a neutralization capacity of at least 2 between its original pH and pH 6.5. No upper limit is given to its neutralization capacity, because the larger the neutralization capacity, the longer its useful life. It may be 25, 50, 100 or even 250 or more.

However, neutralization capacity beyond substantially 50 is largely wasted since, to be effective, contact must be made between the litter and the odor-producing media or gases generated therefrom and the litter must be replaced when sufficient fecal matter has accumulated to hinder this. It may be advantageous economically to mix an untreated litter base such as untreated corn cob grits, sawdust, etc. with the treated litter which has an initial pH of 2.5 to 3.5 and sufficient neutralization capacity so that when mixed with the treated litter of this invention the mixture will have a neutralization capacity of at least 2. In that event the neutralization capacity of the litter of this invention is advantageously greater than 2. If it is contemplated that one part of the treated litter be mixed with X parts of the untreated litter, the neutralization capacity of the treated litter should be at least approximately $2(1+x)$.

The pH of the litter, as that term is used herein, refers to the pH of the mixture resulting from the maceration of 10 grams of litter in 30 ml. of water at room temperature.

If a mineral acid such as sulfuric acid, phosphoric acid or hydrochloric acid is used to acidify the litter, only a relatively small amount will lower the pH below 2.5. By buffering, as by using a sodium or potassium partial salt of a polybasic mineral acid such as phosphoric acid, a higher pH will be obtained which will still have relatively high neutralization capacity at a pH not above 2.5.

The accompanying drawing shows the difference in the neutralization capacities of citric, phosphoric and sulfuric acids, particularly in the claimed pH range between 2.5 and 6.5. Phosphoric acid is easily buffered in this range. Citric acid can be used without buffering, as can benzoic, phthalic and other organic acids. Sulfuric and hydrochloric acids are not ordinarily considered to be bufferable acids. The second ionization constant of sulfuric acid is almost as strong as the first and therefore the remaining hydrogen yields an acid nearly as strong as the original. Also, buffering sulfuric acid up to the lower limit of the claimed pH range results in a litter of high ash content, making its disposal by burning more difficult. The drawing shows that although buffered sulfuric acid might be used, buffered phosphoric acid has the greater neutralization capacity. Cheap sources of phosphate such as the so-called superphosphate can be used alone or with added phosphoric or other mineral acid. Economy may dictate that an inorganic acid be used rather than an acid such as citric acid which has a much greater neutralization capacity.

The following examples illustrate the invention. Other acids and bases may be used. The bases may be organic or inorganic. They must be non-toxic and non-hygroscopic and form non-toxic and non-hygroscopic salts with the acids employed. The bases which may be employed include ammonia, the aromatic amines similar to aniline and the alkyl amines (including mono-, di-, tri- and tetramethyl, ethyl, propyl, butyl, etc. and mixed amines), and the alkali and alkaline metal (including sodium, potassium, calcium and barium) hydroxides, oxides, and carbonates, etc.

For comparison, three litters were made up as follows:

Example I–A

One hundred pounds of corn cob grit (corn cobs ground to 12 to 20 mesh) was sprayed evenly with 20 pounds of an aqueous solution containing 5 pounds of mono-sodium phosphate dihydrate and 0.85 pound of commercial 75 percent phosphoric acid. The material was air dried. It had a pH of 3.4 and its neutralization capacity was 11.8.

Example I–B

One hundred pounds of corn cob grit (12 to 20 mesh) was sprayed with 20 pounds of an aqueous solution containing 5 pounds of mono-sodium phosphate dihydrate and 6.3 pounds of commercial 75 percent phosphoric acid. The material was air dried. It had a pH of 3.9 and its neutralization capacity was 9.99.

Example I–C

Corn cob grit (12–20 mesh) was treated with water and dried. It had a pH of 5.4 and a neutralization capacity of 0.1. It was used as a control.

To 50-gram samples of each of the foregoing there was added 20 ml. of a heavy suspension of *Salmonella pullorum*, and each inoculated sample was divided into a number of portions which were put in sterile screw-cap tubes. Each day one tube of each of the three samples was tested for the presence of *Salmonella pullorum*. The results are shown below, in terms of the number of colonies of *Salmonella pullorum* present.

| Example | I-A | I-B | I-C |
|---|---|---|---|
| 3rd Day | Few | Numerous | Numerous. |
| 4th Day | do | do | Many. |
| 5th Day | do | do | Do. |
| 6th Day | None | do | Do. |
| 7th Day | do | do | Do. |

It is evident that while Example I–B inhibited the growth of the bacteria, Example I–A killed them. An initial pH below about 3.5 is therefore preferred.

The depth of litter in the cage, and the amount per animal will vary with different animals.

A preparation such as that of Example I–B, spread to a depth of about 1 inch in a rabbit cage, remained free of odor for three weeks although 10 percent fecal matter was mixed with the litter at the end of that time.

*Example II*

One hundred pounds of corn cob grit (12–20 mesh) was sprayed with 30 pounds of a solution containing 10 pounds of mono-sodium phosphate dihydrate and 1.6 pounds of 75 percent phosphoric acid. Dried to 115 pounds, this had a pH of 3.52. Its neutralization capacity was 23. Spread to a depth of ½ inch in a guinea-pig cage, the cage remained free of objectionable odor for 28 days.

*Example III*

One hundred pounds of corn cob grit (12–20 mesh) was sprayed with 30 pounds of an aqueous solution of 5 pounds of citric acid. The litter was dried to a weight of 115 pounds. It had a pH of 2.4 and a neutralization capacity of 36.9.. In a guinea-pig cage it remained free of odor for five weeks.

*Example IV*

One hundred pounds of wood sawdust was sprayed with 2 gallons of an aqueous solution of 5 pounds of phosphoric acid to which sufficient sodium hydroxide was added to change the pH from 1.7 to 2.5. The resulting litter had a neutralization capacity of 11.5. Spread to a depth of 1 inch in a white-mice cage, this litter remained free of objectionable odor for three weeks.

*Example V*

One hundred grams of ground peanut shells were treated with 1 percent aqueous solution of adipic acid, and dried. The dried product contained about 3 percent of adipic acid. It had a pH of 2.5 and a neutralization capacity of 22.5. It made a good litter, but was used with animals which would not feed on the shells.

*Example VI*

One hundred pounds of corn cob grit was tumbled with 5 pounds of powdered superphosphate—acidity as available phosphoric acid (a.p.a.) 46%—and then sprayed with 2 gallons of water to combine the phosphate with the grit. The litter on drying to 110 pounds had a pH of 3.3 when slurried with three times its weight of water and a neutralization capacity of 9.6.

*Example VII*

Ninety pounds of corn cob grit (20–40 mesh) was mixed with 20 pounds of powdered citric acid and then steam was passed through the mass to adhere the citric acid to the grit. After drying the mixture weighed 110 pounds. Its neutralization capacity was 156 in the pH range of 2.4 to 6.5. This material was distributed uniformly over a layer of untreated sawdust in a rabbit cage in the ratio of one part of treated litter to nine parts of sawdust. The litter material was eventually well mixed, owing to the natural movements of the animals. The capacity of the mixed material for the neutralization of basic materials was sufficiently high to inhibit the production of odors substantially as efficiently as if the entire litter material had had a neutralization capacity of only one-tenth that of the material treated with citric acid.

The examples are illustrative and are subject to substitution of materials, changes in the used amount of acid and buffer, etc. within wide limits. Mineral litter, etc. may be mixed with the treated cellulosic litter if this is found desirable, but only in minor proportion.

The invention is covered in the claims which follow.

What we claim is:

1. An acidified cellulosic litter with (1) a pH of substantially 2.5 to 3.5 and (2) a neutralization capacity of at least 2, said neutralization capacity being based on attaining a pH no higher than 6.5.

2. The litter of claim 1 in which the cellulosic matter of the litter is essentially corn cob grit.

3. The litter of claim 1 in which the cellulosic matter of the litter is essentially sawdust.

4. The litter of claim 1 in which the litter is essentially corn cob grit acidified with phosphoric acid buffered by an alkali metal inorganic base.

5. The litter of claim 1 which includes superphosphate to acidify the cellulosic matter.

6. The litter of claim 1 which is adapted to be mixed with untreated litter in the ratio of one part to X parts in which the neutralization capacity of the acidified cellulosic litter is at least $2(1+x)$.

References Cited in the file of this patent

UNITED STATES PATENTS

| | | |
|---|---|---|
| 1,967,333 | Smith | July 24, 1934 |
| 2,179,591 | Godchaux | Nov. 14, 1939 |
| 2,279,405 | Laughlin | Apr. 14, 1942 |
| 2,597,457 | Cook | May 20, 1952 |
| 2,649,759 | Gibbs | Aug. 25, 1953 |
| 2,708,418 | Sugarman et al. | May 17, 1955 |
| 2,895,873 | Sawyer et al. | July 21, 1959 |

OTHER REFERENCES

McCulloch, Ernest C.: Disinfection and Sterilization, 1945, pages 231–238 and 256–258.